United States Patent
Gu et al.

(10) Patent No.: US 11,795,082 B2
(45) Date of Patent: Oct. 24, 2023

(54) SPLIT CONTINUOUS OPERATION MICRO-GRID DYNAMIC MEMBRANE BIOREACTOR

(71) Applicants: Chongqing University, Chongqing (CN); Chongqing Yuanxian Environmental Technology Co., Ltd., Chongqing (CN)

(72) Inventors: Li Gu, Chongqing (CN); Xiaofeng Xu, Chongqing (CN); Jianhao Li, Chongqing (CN); Wen Li, Chongqing (CN); Meng Gao, Chongqing (CN); Hua Xiang, Chongqing (CN); Qiang He, Chongqing (CN)

(73) Assignees: CHONGQING UNIVERSITY; CHONGQING YUANXIAN ENVIRONMENTAL TECHNOLOGY CO., LTD.

( * ) Notice: Subject to any disclaimer, the term of this patent is extended or adjusted under 35 U.S.C. 154(b) by 58 days.

(21) Appl. No.: 17/397,370

(22) Filed: Aug. 9, 2021

(65) Prior Publication Data
US 2022/0055930 A1    Feb. 24, 2022

(30) Foreign Application Priority Data
Aug. 20, 2020   (CN) .......................... 202010842338.7

(51) Int. Cl.
*C02F 3/30*   (2023.01)
*C02F 3/12*   (2023.01)
(Continued)

(52) U.S. Cl.
CPC ............ *C02F 3/301* (2013.01); *C02F 3/1268* (2013.01); *C02F 3/2853* (2013.01); *C02F 3/34* (2013.01);
(Continued)

(58) Field of Classification Search
CPC ...... C02F 3/301; C02F 3/1268; C02F 3/2853; C02F 3/34; C02F 2201/005;
(Continued)

(56) References Cited

U.S. PATENT DOCUMENTS

| | | | | |
|---|---|---|---|---|
| 3,914,164 A | * | 10/1975 | Clark | ........................ C02F 3/34 |
| | | | | 205/756 |
| 5,143,631 A | * | 9/1992 | Furrer | .................... B01D 29/03 |
| | | | | 210/791 |
| 5,849,183 A | * | 12/1998 | Ota | ........................ B01D 33/37 |
| | | | | 198/716 |

FOREIGN PATENT DOCUMENTS

| | | | | |
|---|---|---|---|---|
| CN | 209619102 U | * | 11/2019 | ................ C02F 9/12 |
| KR | 100969220 B1 | * | 7/2010 | ............. B01D 61/00 |

OTHER PUBLICATIONS

JP_2012106176_A_M.pdf (Year: 2016).*

* cited by examiner

*Primary Examiner* — Ekandra S. Miller-Cruz
(74) *Attorney, Agent, or Firm* — McDonnell Boehnen Hulbert & Berghoff LLP

(57) ABSTRACT

Disclosed is a split continuous operation micro-grid dynamic membrane bioreactor. The split continuous operation micro-grid dynamic membrane bioreactor comprises a biological treatment unit and a drum dynamic membrane filtration unit, wherein the biological treatment unit comprises a microbiological treatment tank, and a water inlet pipe is arranged on the microbiological treatment tank; the drum dynamic membrane filtration unit comprises a filter tank, and a drum micro-grid dynamic membrane mechanism is arranged in the filter tank; the drum micro-grid dynamic membrane mechanism comprises a filter drum, a backwashing device is arranged above the filter drum, and a sludge collecting tank is arranged in the filter drum; a water outlet
(Continued)

is formed in the bottom of the filter tank; a mixed liquid pipe is arranged between the microbiological treatment tank and the filter drum; and a sludge discharge header pipe is arranged on the sludge collecting tank.

5 Claims, 2 Drawing Sheets

(51) Int. Cl.
*C02F 3/28* (2023.01)
*C02F 3/34* (2023.01)

(52) U.S. Cl.
CPC .. *C02F 2201/005* (2013.01); *C02F 2201/006* (2013.01); *C02F 2203/006* (2013.01); *C02F 2209/42* (2013.01); *C02F 2301/046* (2013.01); *C02F 2303/16* (2013.01)

(58) Field of Classification Search
CPC .......... C02F 2201/006; C02F 2203/006; C02F 2209/42; C02F 2301/046; C02F 2303/16; C02F 2303/20; C02F 3/30; C02F 1/001; C02F 2303/14; Y02W 10/10
USPC ......................................................... 210/109
See application file for complete search history.

SPLIT CONTINUOUS OPERATION MICRO-GRID DYNAMIC MEMBRANE BIOREACTOR

CROSS REFERENCE TO RELATED APPLICATION(S)

This patent application claims the benefit and priority of Chinese Patent Application No. 202010842338.7, filed on Aug. 20, 2020, the disclosure of which is incorporated by reference herein in its entirety as part of the present application.

TECHNICAL FIELD

The present disclosure belongs to the technical field of membrane bioreactors, and particularly relates to a split continuous operation micro-grid dynamic membrane bioreactor.

BACKGROUND ART

It is known from the records of "research on operation characteristics of dynamic membrane-bioreactor for treating municipal sewage" (environmental pollution and control, Zhichao Wu, Lumei Tian, Xu Wang and Zhiwei Wang) that the membrane bioreactor is a new sewage treatment process in combination with a membrane technology and a sewage biological treatment technology, has attracted wide attention in recent years, and the new sewage treatment process is gradually applied to treatment of urban domestic sewage and industrial wastewater. The membrane bioreactor has the following main advantages:

firstly, under the interception effect of a membrane assembly, the concentration of sludge in the biochemical tank is high, and the microorganism treatment ability is strong;

secondly, the membrane assembly has a good interception effect on fine particles in water, and the effluent transparency is high; and thirdly, due to the application of the membrane assembly, a sedimentation tank is not needed in the treatment process, and the area of a treatment station is reduced.

However, limited by the material, process and price of the membrane, the membrane bioreactor mainly faces the following problems:

firstly, a common ultra-filtration membrane assembly is susceptible to membrane fouling, which leads to membrane flux decrease after operation for a period of time, so backwashing needs to be performed in time; and after the membrane has been used for 2-3 years, off-line backwashing further needs to be carried out on the membrane;

secondly, due to the fact that the ultra-filtration membrane assembly is mostly adopted, in practice, a special water production pump and a special backwashing water pump need to be adopted;

thirdly, in order to control membrane fouling, a large amount of aeration is usually carried out on the surface of the membrane assembly in practice to flush the membrane surface with bubbles to reduce the membrane fouling.

fourthly, an existing membrane bioreactor cannot effectively discharge sludge, the concentration of inorganic particles in a biochemical reactor can be gradually increased after long-time operation, and regular manual discharge is needed; and fifthly, the membrane bioreactor also has the problems of complex control and low reliability in the miniaturization process (integrated equipment). Wider application of the membrane bioreactor is limited by the above problems.

It is known from "influence of micro-grid materials on formation of dynamic membranes" (Chinese Journal of Environmental Engineering, Shu Zhang, Mingyuan Zhou, Hongguang Yu, Zhichao Wu, Xuefeng Zhu, Maoqian Lang) that the micro-grid dynamic membrane bioreactor is an innovative process formed before and after 2010, and is mainly characterized in that floc in the bioreactor is effectively intercepted through the micro-grid, so that the intercepted biological floc is used for forming a filter medium, so that the flux of the membrane is greatly improved on the basis of ensuring the effluent quality, and the backwashing period of the membrane is prolonged. Installation and later replacement investment of the membrane filtration assembly are effectively avoided, and energy consumption required by membrane water production and backwashing is reduced. The process is increasingly concerned by water treatment technology researchers at home and abroad. However, at present, the basic configuration of the micro-grid dynamic membrane reactor is still similar to that of an original membrane bioreactor. The installation site of the micro-grid is still inside the reactor. The effluent of the production pump and the backwashing pump are used for backwashing, and the precise control of sludge discharge has not been effectively solved.

SUMMARY

For this purpose, the present disclosure aims to provide a split continuous operation micro-grid dynamic membrane bioreactor, which can realize the technical effect of continuous operation, has the advantages of low manufacturing cost and low operation energy consumption and can effectively ensure the quality of effluent water.

To achieve the above purpose, the present disclosure provides the following technical scheme:

The split continuous operation micro-grid dynamic membrane bioreactor comprises a biological treatment unit and a drum dynamic membrane filtration unit;

the biological treatment unit comprises a microbiological treatment tank, and the microbiological treatment tank comprises an aerobic treatment tank, an anoxic treatment tank and an anaerobic treatment tank;

the drum dynamic membrane filtration unit comprises a filter tank, and a drum micro-grid dynamic membrane mechanism is arranged in the filter tank;

the drum dynamic membrane mechanism comprises a filter drum, a backwashing device used for washing the filter drum and keeping the thickness of a dynamic biological membrane formed on the filter drum within a set thickness range is arranged above the filter drum, and a sludge collecting tank used for collecting the washed dynamic biological membrane filter layer is arranged in the filter drum;

a water outlet which is formed in the lower part of the filter drum and enables the water level of the filter tank to be lower than that in the microbiological treatment tank is formed in the bottom of the filter tank;

a mixed liquid pipe used for enabling sewage sludge mixed liquid to flow into the filter drum from the microbiological treatment tank is arranged between the microbiological treatment tank and the filter drum; and a sludge discharge header pipe is arranged on the sludge collecting tank.

Further, a filter medium is arranged on the filter drum, the filter medium adopts a stainless steel wire mesh or non-woven filter cloth, and the filter pore diameter of the filter medium is 20-500 μm.

Further, a Y-union is arranged on the sludge discharge header pipe, a sludge discharge pipe and a sludge return pipe are arranged on the Y-union, the sludge return pipe communicates with the microbiological treatment tank, and a sludge discharge control mechanism for directly discharging sludge from the sludge discharge pipe or enabling the sludge to flow back into the microbiological treatment tank through the sludge return pipe is arranged between the sludge discharge pipe and the sludge return pipe.

Further, the sludge discharge control mechanism comprises a sludge discharge valve arranged on the sludge discharge pipe; or, opening and closing valves are arranged on the sludge discharge pipe and the sludge return pipe respectively.

Further, a backwashing water port is formed in the bottom of the filter tank, a backwashing water pipe is arranged between the backwashing water port and a water inlet of the backwashing device, and a backwashing water pump is arranged on the backwashing water pipe.

Further, the filter drum comprises a filter cartridge, two ends of the filter cartridge are provided with sealing plates respectively, a central hole coaxial with the filter cartridge is formed in one of the sealing plates, and the inner diameter of each central hole is smaller than that of the filter cartridge.

Further, one end of the mixed liquid pipe is connected with the microbiological treatment tank, the other end of the mixed liquid pipe stretches into the filter drum through the central holes, and the overflow water level of the mixed liquid pipe is equal to the elevations of the lowest points of the central holes.

The present disclosure has the following beneficial effects:

According to the split continuous operation micro-grid dynamic membrane bioreactor in the present disclosure, by arranging the front-end biological treatment unit, pollutants in the sewage are decomposed and removed by utilizing microorganisms growing in the microbiological treatment tank, so that the technical effect of biological treatment of the sewage is achieved; by arranging the split drum dynamic membrane filtration unit, suspended solids in the mixed liquid are filtered and intercepted by utilizing the micro-grid drum, a dynamic microbiological floc layer is formed on the surface of the micro-grid filter drum, the sewage is filtered by utilizing the microbiological floc layer, the sewage treatment requirement can be met, and the requirement of effluent SS (Suspended Solids) is ensured; and according to the split continuous operation micro-grid dynamic membrane bioreactor in the present disclosure, the microbiological treatment tank and the filter tank are arranged in a split mode, namely, biological purification treatment and dynamic biological membrane filtration treatment are independently carried out in two steps, when the filter drum is subjected to backwashing, the biological treatment unit is not affected, and backwashing and filtration treatment of the filter drum can be simultaneously carried out, so that the technical effect of continuous operation can be realized.

The mixed liquid pipe is arranged between the filter drum and the microbiological treatment tank, so that a communicating vessel structure can be formed between the filter drum and the microbiological treatment tank, namely, the water level in the filter drum is always kept equal to that of the microbiological treatment tank, and equipment such as a water pump does not need to be independently arranged between the microbiological treatment tank and the filter tank; meanwhile, the water outlet is formed in the lower part of the filter drum, so that the water level in the filter tank is always lower than that of the microbiological treatment tank, namely, the water level in the filter drum can be higher than that in the filter tank, automatic filtration can be realized by utilizing water level pressure difference, and additional equipment such as a water production pump is not needed; and therefore, the split continuous operation micro-grid dynamic membrane bioreactor in the present disclosure can automatically operate and achieve the technical purposes of energy conservation and consumption reduction.

By arranging the sludge discharge pipe and the sludge return pipe, the flow direction of the sludge is controlled by utilizing the sludge discharge control mechanism. Fallen sludge obtained by backwashing flows back into the microbiological treatment tank through the sludge return pipe, and the amount of sludge in the microbiological treatment tank is maintained, so that the biological treatment unit is kept high in efficiency; in addition, by means of the Y-union and the valve on the sludge discharge pipe, the opening and closing time of the sludge discharge valve is accurately controlled through a circuit, the sludge discharge amount can be accurately controlled, the discharged sludge is subjected to pressure filtration concentration, and the water content of the discharged sludge can reach the level lower than 95%.

The suspended solids in the mixed liquid are intercepted on the filter drum to form the dynamic biological membrane, and the dynamic biological membrane has the advantages of being low in manufacturing cost, short in membrane formation time, good in permeability, high in membrane flux, high in anti-pollution capacity, good in effluent quality and the like.

In conclusion, the split continuous operation micro-grid dynamic membrane bioreactor in the present disclosure can realize continuous operation without the need of a water producing and backwashing system required for a traditional MBR (Membrane Bio-Reactor) technology, has the advantages of low manufacturing cost and low operation energy consumption, and can effectively ensure the quality of effluent water.

BRIEF DESCRIPTION OF THE DRAWINGS

In order to make the objects, technical schemes and beneficial effects of the present disclosure clearer, the present disclosure provides the following attached figures for illustration.

REFERENCE SIGNS IN DRAWINGS 10, biological treatment unit; 11, microbiological treatment tank; 12, water inlet pipe; 13, water inlet valve; 20, drum dynamic membrane filtration unit; 21, filter tank; 22, filter drum; 221, filter cartridge; 222, sealing plate; 223, central hole; 23, dynamic biological membrane; 24, backwashing device; 25, sludge collecting tank; 26, water outlet; 27, backwashing water port; 28, backwashing water pipe; 29, backwashing water pump;

30, mixed liquid pipe; 31, sludge discharge header pipe; 32, Y-union; 33, sludge discharge pipe; 34, sludge return pipe; and 35, sludge discharge valve.

DETAILED DESCRIPTION OF THE EMBODIMENTS

The present disclosure is further described in conjunction with the attached figures and specific embodiments so that those skilled in the art can better understand and implement the present disclosure, but the embodiments are not intended to be limitation of the present disclosure.

Figure 1:
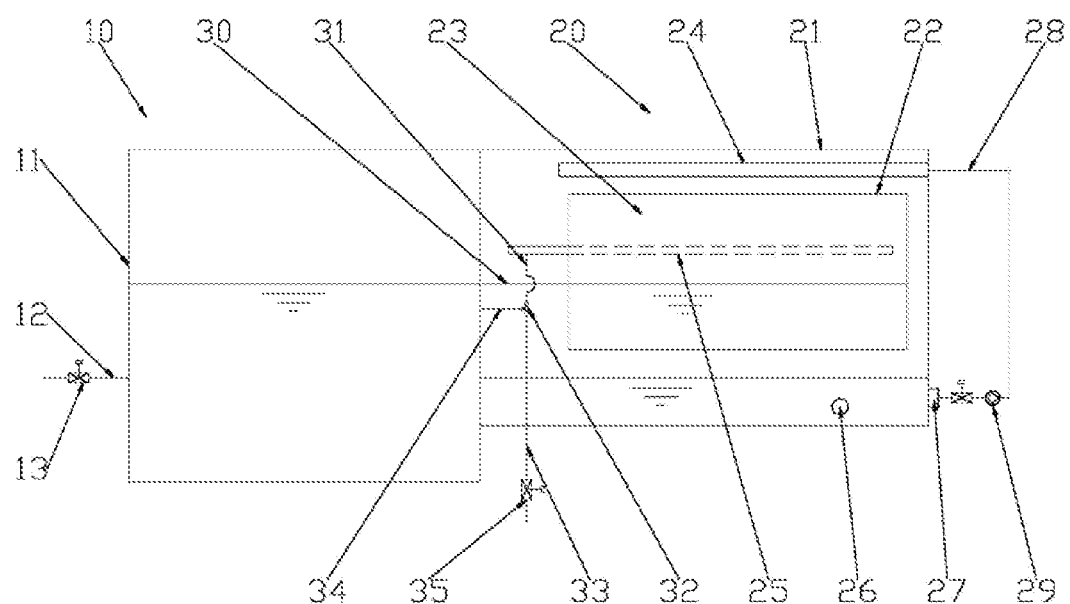
FIG. 1 is a structural schematic diagram of an embodiment of a split continuous operation micro-grid dynamic membrane bioreactor in the present disclosure.

As shown in FIG. 1, FIG. 1 is a structural schematic diagram of an embodiment of a split continuous operation micro-grid dynamic membrane bioreactor in the present disclosure. The split continuous operation micro-grid dynamic membrane bioreactor in the embodiment comprises a biological treatment unit 10 and a drum dynamic membrane filtration unit 20.

Specifically, the biological treatment unit 10 comprises a microbiological treatment tank 11, a water inlet pipe 12 is arranged on the microbiological treatment tank 11, a water inlet valve 13 is arranged on the water inlet pipe 12 in the embodiment, and the water inlet amount of sewage can be controlled through the water inlet valve 13, so that the water level of the microbiological treatment tank 11 is kept within a set range.

The drum dynamic membrane filtration unit 20 in the embodiment comprises a filter tank 21, and a drum dynamic membrane mechanism is arranged in the filter tank 21. The drum dynamic membrane mechanism in the embodiment comprises a filter drum 22, a backwashing device 24 used for washing the filter drum 22 and keeping the thickness of a dynamic biological membrane 23 formed on the filter drum 22 within a set thickness range is arranged above the filter drum 22, and a sludge collecting tank 25 used for collecting the washed dynamic biological membrane is arranged in the filter drum 22. A water outlet 26 which is formed in the lower part of the filter drum 22 and enables the water level of the filter tank 21 to be lower than that in the microbiological treatment tank 11 is formed in the bottom of the filter tank 21. A filter medium is arranged on the filter drum 22, the filter medium adopts a stainless steel wire mesh or non-woven filter cloth, and the filter pore diameter of the filter medium is 20-500 μm, so that the requirement of forming the dynamic biological membrane 23 can be met.

A mixed liquid pipe 30 used for enabling sewage sludge mixed liquid to flow into the filter drum 22 from the microbiological treatment tank 11 is arranged between the microbiological treatment tank 11 and the filter drum 22 in the embodiment; and a sludge discharge header pipe 31 is arranged on the sludge collecting tank 25.

Further, a Y-union 32 is arranged on the sludge discharge header pipe 31, a sludge discharge pipe 33 and a sludge return pipe 34 are arranged on the Y-union 32, the sludge return pipe 34 communicates with the microbiological treatment tank 11, and a sludge discharge control mechanism for directly discharging sludge from the sludge discharge pipe 33 or enabling the sludge to flow back into the microbiological treatment tank 11 through the sludge return pipe 34 is arranged between the sludge discharge pipe 33 and the sludge return pipe 34. The sludge discharge control mechanism in the present embodiment comprises a sludge discharge valve 35 arranged on the sludge discharge pipe 33. When the sludge discharge valve 35 is closed, the sludge flows back into the microbiological treatment tank 11 from the sludge return pipe 34 so as to maintain the amount of the sludge in the microbiological treatment tank 11, so that the biological sewage treatment process is efficient and continuous; and when the sludge discharge valve 35 is opened, the sludge is directly discharged from the sludge discharge pipe 33, and the amount of the sludge discharged from the sludge discharge pipe 33 can be accurately controlled by controlling the opening and closing time of the sludge discharge valve 35. Definitely, the sludge discharge control mechanism can also be realized in other various modes, for example, opening and closing valves can be arranged on the sludge discharge pipe 33 and the sludge return pipe 34 respectively, and the technical purpose that the sludge is discharged from the sludge discharge pipe 33 or flows back from the sludge return pipe 34 is achieved by respectively controlling the opening and closing of the opening and closing valves.

Further, a backwashing water port 27 is formed in the bottom of the filter tank 21 in the embodiment, a backwashing water pipe 28 is arranged between the backwashing water port 27 and a water inlet of the backwashing device 24, and a backwashing water pump 29 is arranged on the backwashing water pipe 28, so that cyclic utilization of water is realized without the need of an external water source.

Figure 2:
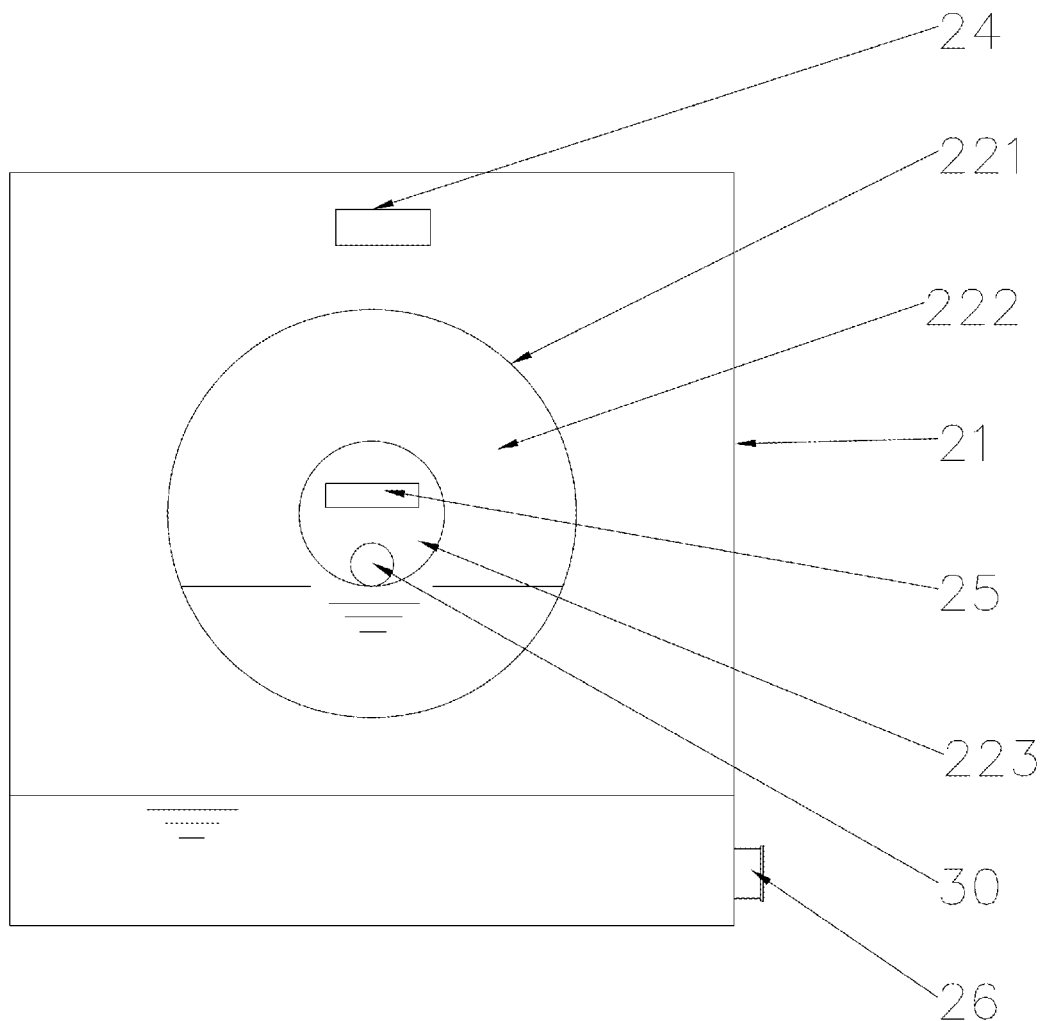
FIG. 2 is a structural schematic diagram of a drum dynamic membrane filtration unit.

Further, the filter drum 22 comprises a filter cartridge 221, two ends of the filter cartridge 221 are provided with sealing plates 222 respectively, a central hole 223 coaxial with the filter cartridge 221 is formed in one of the sealing plates 222, and the inner diameter of each central hole 223 is smaller than that of the filter cartridge 221. As shown in FIG. 2, one end of the mixed liquid pipe 30 in the embodiment is connected with the microbiological treatment tank 11, the other end of the mixed liquid pipe 30 stretches into the filter drum 22 through the central holes 223, and the overflow water level of the mixed liquid pipe 30 is equal to the elevations of the lowest points of the central holes 223, so that when the water level in the microbiological treatment tank 11 is higher than the elevations of the lowest points of the central holes 223, the mixed liquid automatically overflows to the filter drum 22 through the mixed liquid pipe 30 for filtration. In the embodiment, the filter drum 22 is manufactured by adopting the filter medium, the filter medium adopts a stainless steel wire mesh or non-woven filter cloth, and the filter pore diameter of the filter medium is 20-500 μm, so that the requirement of forming the dynamic biological membrane 23 can be met.

According to the split continuous operation micro-grid dynamic membrane bioreactor in the embodiment, by arranging the biological treatment unit, pollutants in the sewage are decomposed and removed by utilizing microorganisms growing in the microbiological treatment tank, so that the technical effect of biological treatment of the sewage is achieved; by arranging the drum dynamic membrane filtration unit, suspended solids in the mixed liquid are intercepted by utilizing the filter drum to form the dynamic biological membrane, so that the sewage is filtered, the sewage treatment requirement can be met, and the effluent quality is ensured; and according to the split continuous operation micro-grid dynamic membrane bioreactor in the embodiment, the microbiological treatment tank and the filter tank are arranged in a split mode, namely, biological purification treatment and dynamic biological membrane filtration treatment are independently carried out in two steps, when the filter drum is subjected to backwashing, the biological treatment unit is not affected, and backwashing and filtration treatment of the filter drum can be simultaneously carried out, so that the technical effect of continuous operation can be realized.

The mixed liquid pipe is arranged between the filter drum and the microbiological treatment tank, so that a communicating vessel structure can be formed between the filter drum and the microbiological treatment tank, namely, the water level in the filter drum is always kept equal to that of the microbiological treatment tank, and equipment such as a water pump does not need to be independently arranged between the microbiological treatment tank and the filter tank; meanwhile, the water outlet is formed in the lower part of the filter drum, so that the water level in the filter tank is always lower than that of the microbiological treatment tank, namely, the water level in the filter drum can be higher than that in the filter tank, and under the action of water level pressure difference, the micro-grid filter drum can achieve automatic filtration without additional equipment such as a water production pump; and therefore, the split continuous operation micro-grid dynamic membrane bioreactor in the embodiment can automatically operate and achieve the technical purposes of energy conservation and consumption reduction.

The suspended solids in the mixed liquid are intercepted on the filter drum to form the dynamic biological membrane, and the dynamic biological membrane has the advantages of being low in manufacturing cost, short in membrane formation time, good in permeability, high in membrane flux, high in anti-pollution capacity, good in effluent quality and the like.

In conclusion, the split continuous operation micro-grid dynamic membrane bioreactor in the embodiment can realize continuous operation, has the advantages of low manufacturing cost and low operation energy consumption, and can effectively ensure the quality of effluent water.

The embodiments described above are only preferred embodiments to fully illustrate the present disclosure, and the scope of protection of the present disclosure is not limited to this. Equivalent substitutions or transformations made by those skilled in the art on the basis of the present disclosure are within the scope of protection of the present disclosure. The protection scope of the present disclosure is based on the claims.

What is claimed is:

1. A split continuous operation micro-grid dynamic membrane bioreactor, comprising a biological treatment unit (10) and a drum dynamic membrane filtration unit (20), wherein the biological treatment unit (10) comprises a microbiological treatment tank (11), and the microbiological treatment tank (11) comprises an aerobic treatment tank, an anoxic treatment tank and an anaerobic treatment tank; the drum dynamic membrane filtration unit (20) comprises a filter tank (21), and a drum micro-grid dynamic membrane mechanism is arranged in the filter tank (21); the drum dynamic membrane mechanism comprises a filter drum (22), a backwashing device (24) configured for washing the filter drum (22) and keeping the thickness of a dynamic biological membrane (23) formed on the filter drum (22) within a set thickness range is arranged above the filter drum (22), and a sludge collecting tank (25) used for collecting a washed dynamic biological membrane is arranged in the filter drum (22); a water outlet (26) which is formed below the filter drum (22) and enables the water level of the filter tank (21) to be lower than that in the microbiological treatment tank (11) is formed in the bottom of the filter tank (21); a mixed liquid pipe (30) configured for enabling sewage sludge mixed liquid to flow into the filter drum (22) from the microbiological treatment tank (11) is arranged between the microbiological treatment tank (11) and the filter drum (22); and a sludge discharge header pipe (31) is arranged on the sludge collecting tank (25); wherein a Y-union (32) is arranged on the sludge discharge header pipe (31), a sludge discharge pipe (33) and a sludge return pipe (34) are arranged on the Y-union (32), and the sludge return pipe (34) is connected to the microbiological treatment tank (11) between the microbiological treatment tank (11) and the Y-union, and a sludge discharge control mechanism configured to (i) discharge sludge from the sludge discharge pipe (33) or (ii) to enable the sludge to flow back into the microbiological treatment tank (11) through the sludge return pipe (34) is arranged on the sludge discharge pipe (33).

2. The split continuous operation micro-grid dynamic membrane bioreactor according to claim 1, wherein a filter medium is arranged on the filter drum (22), the filter medium comprises a stainless steel wire mesh or non-woven filter cloth, and a filter pore diameter of the filter medium is 20-500 µm.

3. The split continuous operation micro-grid dynamic membrane bioreactor according to claim 1, wherein the sludge discharge control mechanism comprises a sludge discharge valve (35) arranged on the sludge discharge pipe (33).

4. The split continuous operation micro-grid dynamic membrane bioreactor according to claim 1, wherein a backwashing water port (27) is formed in the bottom of the filter tank (21), a backwashing water pipe (28) is arranged between the backwashing water port (27) and a water inlet of the backwashing device (24), and a backwashing water pump (29) is arranged on the backwashing water pipe (28).

5. The split continuous operation micro-grid dynamic membrane bioreactor according to claim 1, wherein the filter drum (22) comprises a filter cartridge (221), two ends of the filter cartridge (221) are provided with sealing plates (222) respectively, a central hole (223) coaxial with the filter cartridge (221) is formed in one of the sealing plates (222), and the inner diameter of the central hole (223) is smaller than that of the filter cartridge (221).

* * * * *